United States Patent
Ishii

(10) Patent No.: US 6,311,143 B1
(45) Date of Patent: Oct. 30, 2001

(54) SUITING APPARATUS AND SUITING METHOD

(76) Inventor: Masaharu Ishii, #406, 2-701 Moritakahigashi, Moriyama-ku, Nagoya-shi, Aichi 463 (JP)

( * ) Notice: Subject to any disclaimer, the term of this patent is extended or adjusted under 35 U.S.C. 154(b) by 0 days.

(21) Appl. No.: 09/101,203

(22) PCT Filed: Dec. 27, 1996

(86) PCT No.: PCT/JP96/03840

§ 371 Date: Jul. 2, 1998

§ 102(e) Date: Jul. 2, 1998

(87) PCT Pub. No.: WO97/25658

PCT Pub. Date: Jul. 17, 1997

(30) Foreign Application Priority Data

Jan. 5, 1996 (JP) .................................................... 8-017128

(51) Int. Cl.[7] .............................. G06F 7/60; G06F 17/10; G06F 101/00
(52) U.S. Cl. .................................. 703/2; 703/13; 700/28
(58) Field of Search ................................ 703/2, 3, 6, 13; 700/28

(56) References Cited

FOREIGN PATENT DOCUMENTS 0364090    4/1990    (EP) .
7-226656   8/1995    (JP) .

OTHER PUBLICATIONS

Djaferis, "Representation of Controllers that Achieve Robust Performance for Systems with Real Parameter Uncertainty", Proceeedings of the 29th IEEE Conference on Decision and Control, pp. 1201–1202, Dec. 1990.*

Djaferis et al, "FIT Synthesis for Robust Performance", Proceedings of the 33rd IEEE Conference on Decision and Control, pp. 484–489, Dec. 1994.*

"Set–Membership Identification of Systems with Parametric Uncertainty" by Robert L. Kosut, et al.—IEEE Transactions On Automatic Control: vol. 37, No. 7, Jul. 1992, pp. 929–941.

"Hard Frequency–Domain Model Error Bounds from Least--Squares Like Identification Techniques" by Bo Wahlberg, et al.–IEEE Transactions on Automatic Control: vol. 37, No. 7, Jul. 1992, pp 900–912.

* cited by examiner

Primary Examiner—Kevin J. Teska
Assistant Examiner—Samuel Broda
(74) Attorney, Agent, or Firm—Greenblum & Bernstein, P.L.C.

(57) ABSTRACT

With respect to input data having the spread of errors or the like, "a suiting method" is to obtain a suiting function, which exist within a region of this spread, and which is highly robust. A suiting region (between an upper bound function $M^+(x_i)$ and a lower bound function $M^-(x_i)$) is set based on the input data with the spread of errors. An inequality system is established with respect to the suiting region and the suiting function having undetermined parameters. A distance from a boundary of a solution region of the parameter values, corresponding to a boundary of the suiting region, is set, and a suiting function f(x) which has the parameter values maximizing the distance, is found. A broken line exhibits a suiting function f(x) having low robustness, and a solid line exhibits a most-robust suiting function f(x) obtained from an application of this invention.

40 Claims, 7 Drawing Sheets

SUITING APPARATUS AND SUITING METHOD

TECHNICAL FIELD OF THE INVENTION

The present invention relates to an apparatus and a method which can be utilized for a design of, for example, a digital filter and so on, and which gives robustness to a function that may be used for such a design.

BACKGROUND OF THE INVENTION

The "robustness" is defined as a robustness of a behavior of a system against deviations. Since an actual system involves various kinds of deviations, a guarantee of the robustness is a very important issue in engineering. For example, when a behavior of a feedback loop system is not practically influenced by the introduction of a certain level of external disturbances thereinto, it is said that the system has a "robustness". As for the deviations, there are not only such external disturbances, but also internal variations of some parameter values caused by characteristic changes due to time passing of parts of the system.

The present inventor has already proposed a suiting method, in which a suiting region is previously set with respect to a physical characteristic, and functions (i.e. suiting functions) contained in the suiting region are found as a family of functions with parameters (cf. Unexamined Japanese Patent Publication (HEI) 7-226656)). According to the previous suiting method, a spread solution region is obtained, and, by using the spread solution region, a parameter design could be performed for a family of functions with a robustness against variations of parameter values.

In the parameter design according to a conventional method of optimizing method, for example, by minimizing a target function, only one optimized set of parameter values is obtained. Due to the obtained optimized parameter values being only one set without any spread, in the parameter design, it is impossible to take a quantitative robustness into consideration with respect to a change of a system behavior which is caused by the introduction of deviations of parameter values thereinto.

Also, in the aforementioned previous suiting method, in order to implement a suiting function, corresponding to the obtained parameter values, to a signal-processing device or the like, it is necessary to select only one set of parameter values from the solution region of the parameter values. Nevertheless, in the aforementioned previous suiting method, a general selection method for promoting a robustness of the suiting function is not especially prepared.

Further, in the aforementioned previous suiting method, there is a case where only one solution is calculated rather than a solution region. In order to obtain a solution uniquely, it is necessary to select how solution is calculated by using additional conditions because a solution of the suiting method ordinarily obtains a solution region. Nevertheless, in the past, the setting of uniformizing-conditions was not performed for promoting the robustness of the suiting function. Thus, generally, the obtained parameter values did not have the desired desired robustness.

Accordingly, in view of the above-mentioned problems, the present invention is directed to an improvement of the above-mentioned suiting method, such that solutions with robustness, and therefore robustly-stable physical systems, can be obtained when a solution region or a unique solution is needed.

DISCLOSURE OF THE INVENTION

In spite of a deviation being introduced into parameter values corresponding to the suiting function, when the parameter values still remain in a suiting region, this deviation is defined as an allowable deviation of this parameter values. In a suiting method according to the present invention, a robust parameter value stands for a parameter value which has large allowable deviations, and a most robust parameter value stands for a parameter value which has the largest allowable deviation.

A suiting apparatus according to the present invention at least comprises means for setting a suiting region corresponding to an allowable range of a physical characteristic, and a suiting function determination means for finding at least one suiting function at least approximately contained in a range of the suiting region, by solving simultaneous inequalities. The suiting apparatus is characterized in that the suiting function determination means sets the suiting function as a family of functions with certain parameters, sets a distance from a boundary of a solution region corresponding to a boundary of the suiting region, and finds a suiting function with robust parameter values by solving the simultaneous inequalities under a condition that the distance becomes larger than a beforehand given level or is maximized.

Also, a suiting method according to the present invention at least comprises a first step of setting a suiting region corresponding to an allowable range of a physical characteristic, and a second step of finding at least one suiting function at least approximately contained in a range of the suiting region. The suiting method is characterized in that the second step sets the suiting function as a family of functions with certain parameters, sets a distance from a boundary of the solution region corresponding to a boundary of the suiting region, and finds a suiting function with robust parameter values by solving the simultaneous inequalities under a condition that the distance becomes larger than a beforehand given level or is maximized.

In this specification, "a physical characteristic" stands for a desired characteristic, desired form, measurement value, communication signal, pattern signal, etc. Also, "a suiting" stands for a method of deriving a function (hereinafter referred to as a suiting function) at least approximately within a region corresponding to a spread of an input (hereinafter referred to as a suiting region), and more concretely a method of deriving a set of parameter values of the suiting function.

This suiting method involves an enormous amount of operations even in a case where the suiting function is expressed in a simple form. Accordingly, it is impossible to find the solution by manual calculation, and it only becomes possible by using a digital computer etc. Also, "a suiting method" stands for a method of executing the suiting, and "suiting apparatus" stands for an apparatus for executing the suiting method. Namely, the suiting apparatus stands for a digital computer or the like by which the suiting method is executed.

A typical suiting method will be explained below using a vector notation.

A representative example of a suiting method is expressed as the procedure of setting an appropriate function with parameters as f(x) and finding parameter values satisfying:

$$M^-(x) < f(x) < M^+(x) (\forall x \in D) \tag{1}$$

Herein: D indicates a domain in a multidimensional space. The inequality system (1) is called a determinating inequality system for the suiting, and the f(x) satisfying inequality system (1) is called a suiting function. Also, $M^+(x)$, which determines the upper bound of the suiting function f(x), is called an upper bound function, and M⁻(x), which determines the lower bound of the suiting function f(x), is called a lower bound function. The entire range determined by upper bound function M⁺(x) and lower bound function M⁻(x) is called a suiting region $T(=\{(x, y)|x \in D, M^-(x) < y < M^+(x)\})$. Upper bound function M⁺(x) and lower bound function M⁻(x) may be set as values of $+\infty$ and $-\infty$, respectively. Also, a suiting region may be set by a center value and an allowable width with respect to the center value.

The inequality system (1) is expressed by a finite number of simultaneous inequalities. A range of the parameter values of f(x) which satisfy all of the finite numbers of inequalities is the solution region. This solution region is obtained by transforming the suiting region to a parameter space. Accordingly, one point in the solution region corresponds to a suiting function which attains a value within the suiting region.

When a suiting function is selected from the solution region, a distance from a boundary of a parameter solution region corresponding to a boundary of the suiting region is set, and a suiting function with robust parameter values is selected such that the distance becomes larger than a beforehand given level or maximum.

Note that in the suiting apparatus and the suiting method according to the present invention, the suiting function f(x) is not only a real-value function, but also may be a functional, an operator, etc., and further may be a recursion relations of a sequence. Also, the domain D may be a discrete set of points or a continuous range, which may be disconnected.

Moreover, it is possible that a plurality of suiting functions to be suited is set, if their parameters are common. In this case, respective different suiting regions may be set with respect to functions to be suited.

DESCRIPTION THE PREFERRED EMBODIMENT

The embodiments of the present invention will now be described below.

First, a suiting apparatus and a suiting method according to the present invention will be explained by Embodiment 1 and Embodiment 2, and then an explanation will be made of the application of the suiting apparatus and method to various systems in the technological and industrial fields by Embodiment 3 and subsequent embodiments.

EMBODIMENT 1

Embodiment 1 is described below.

Here, solution methods for a robust solution, namely robust suiting function, by a suiting method are explained, using the following steps:

1. Reduction of problem of suiting method to inequality system;
2. Solution method of robust solution.

1. Reduction of Problem of Suiting Method to Inequality System

Figure 1:
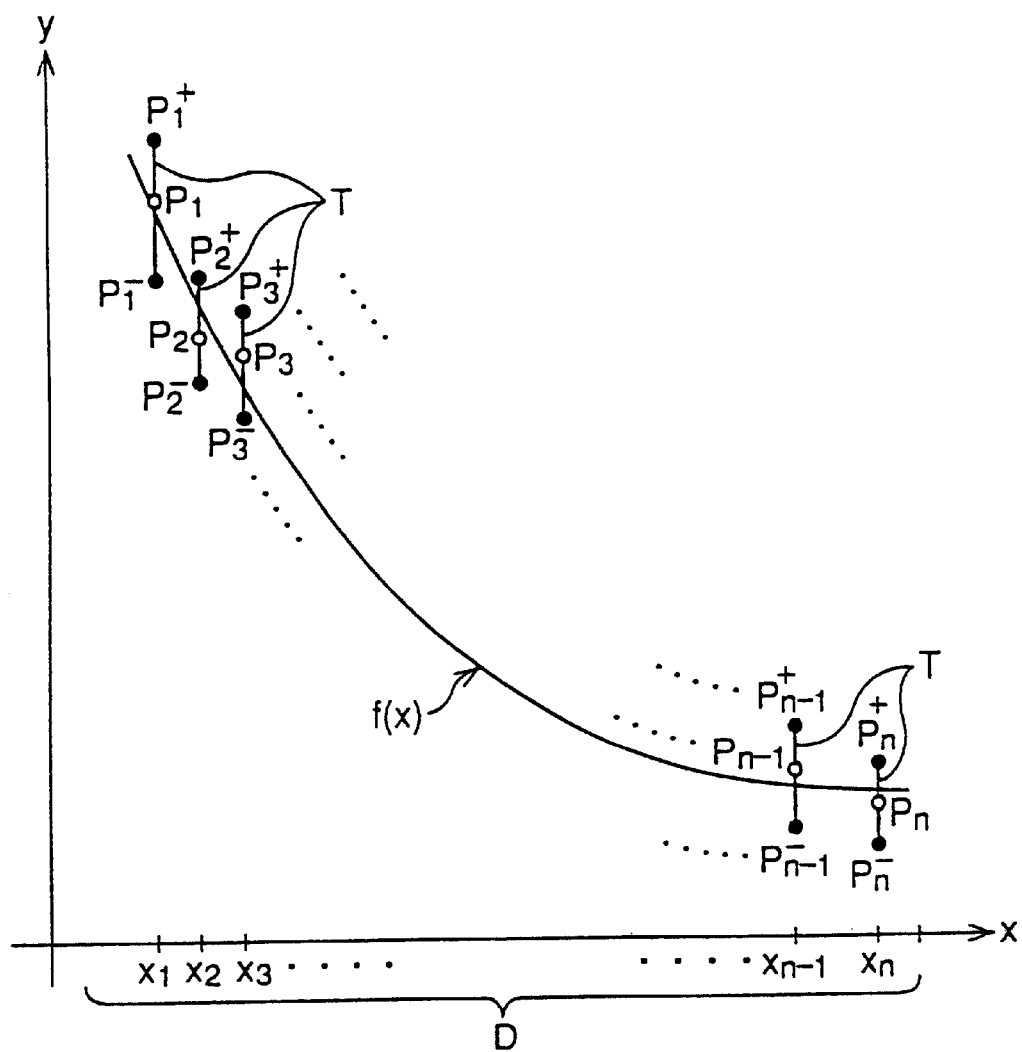
FIG. 1 is a view showing an upper bound function, a lower bound function, and a suiting function of Embodiment 1 of the present invention.

A suiting method will be explained using FIG. 1. In this embodiment, the sequences of points $P_j=(x_j, y_j)$ (j=1, 2, ..., n) are produced based on, for example, input data. The domain D on the axis x, which limits the suiting function becomes $\{x_1, x_2, ..., x_n\}$. Considering the spread due to error of the points $P_i$, etc. on $x=x_i$, upper bound function $M^+(x_i)$ is determined by the upper bound value that can be given by this point $P_i$, and lower bound function $M^-(x_i)$ is determined by the lower bound value. Such a set up is carried out with respect to the sequences of points $P_i$. Namely, the sequences of points $P^+_1=(x_1, y^+_1)$, $P^+_2=(x_2, y^+_2)$, ..., and $P^+_n=(x_n, y^+_n)$ corresponding to the upper bound functions, and the sequences of points $P^-=(x_1, y^-_1)$, $P^-_2=(x_2, y^-_2)$, ..., $P^-_n=(x_n, y^-_n)$ corresponding to the lower bound functions are determined. Note, $y^+_i$ is $M^+(x_i)$, and $y^-_i$ is $M^-(x_i)$. The suiting region T is determined by all of the points of the sequences.

Assume that the suiting function can be expressed by a rational function of the first degree in x as follows:

$$f(x)=(a_0+a_1x)/(b_0+b_1x) \qquad (2)$$

Herein: $a_0$, $a_1$, $b_0$, and $b_1$ are real parameters

When the rational function (2) is substituted in inequality system (1) and, at the same time, the denominator is canceled under the condition that the denominator $(b_0+b_1x_i)$ is positive, inequality system (1) is transformed into the following equivalent inequality systems (3), (4) and (5):

$$-a_0-a_1x_i+b_0M^+(x_i)+b_1x_iM^+(x_i)>0 \qquad (3)$$

$$a_0+a_1x_i-b_0M^-(x_i)-b_0x_iM^-(x_i)>0 \qquad (4)$$

$$b_0+b_1x_i>0 \qquad (5)$$

So as to express inequality systems (3), (4) and (5) as inner products of vectors, a parameter space of 4-dimensions, corresponding to the number of the parameters, is set. The vectors $X$, $\eta^+(x_i)$, $\eta^-(x_i)$ and $\eta_0(x_i)$ in the parameter space are set as follows:

$$X=(a_0, a_1, b_0, b_1) \qquad (6)$$

$$\eta^+(x_i)=(-1, -x_i, M^+(x_i), x_iM^+(x_i)) \qquad (7)$$

$$\eta^-(x_i)=(1, x_i, -M^-(x_i), -x_iM^-(x_i)) \qquad (8)$$

$$\eta_0(x_i)=(0, 0, 1, x_i) \qquad (9)$$

Herein: X is a parameter vector, $\eta^+(x_i)$ (hereinafter referred to as an upper bound vector) is a vector representing the limitation of the upper bound function $M^+(x_i)$, $\eta^-(x_i)$ (hereinafter referred to as a lower bound vector) is a vector representing the limitation of lower bound function $M(x_i)$, and $\eta_0(x_i)$ is a vector representing the condition necessary for preventing the rational function (2) from diverging.

When using these vectors, the determinating inequality system of the suiting method expressed by inequality systems (3), (4) and (5) becomes the following inequality systems (10), (11) and (12) expressed by the inner product with the parameter vector X, respectively:

$$(X, \eta^+(x_i)) > 0 \tag{10}$$

$$(X, \eta^-(x_i)) > 0 \tag{11}$$

$$(X, \eta_0(x_i)) > 0 \tag{12}$$

In this way, since inequality systems (10), (11) and (12) are given to the input point sequence $P_i$ on the domain D, respectively, the problem of finding at least one suiting function is expressed by a finite number of inequalities, and the solution can be actually found. For example, where the number n of the sequences of points $P_i$ is 500, there are 500 sets of the inequalities (10), (11) and (12), respectively.

When the finite number of inequalities obtained with respect to all input sequences of points $P_i$ are simultaneously exhibited and solved for the parameter vector X, a region, where X exists, is called a solution region S. The solution region S generally becomes a convex cone and is expressed by:

$$S = \{s_1 X_1 + s_2 X_2 + \ldots + s_m X_m | s_1, s_2, \ldots, s_m > 0\} \tag{13}$$

The vectors of $X_1 = (a_{10}, a_{11}, b_{10}, b_{11})$, $X_2 = (a_{20}, a_{21}, b_{20}, b_{21})$, ..., $X_m = (a_{m0}, a_{m1}, b_{m0}, b_{m1})$ express the vertices of the solution region S. A suiting function $f(x)$, determined by a point $X_s = (a_{s0}, a_{s1}, b_{s0}, b_{s1})$ inside the solution region S, always gives values within the suiting region T.

2. Solution Method of Robust Solution.

Figure 2:
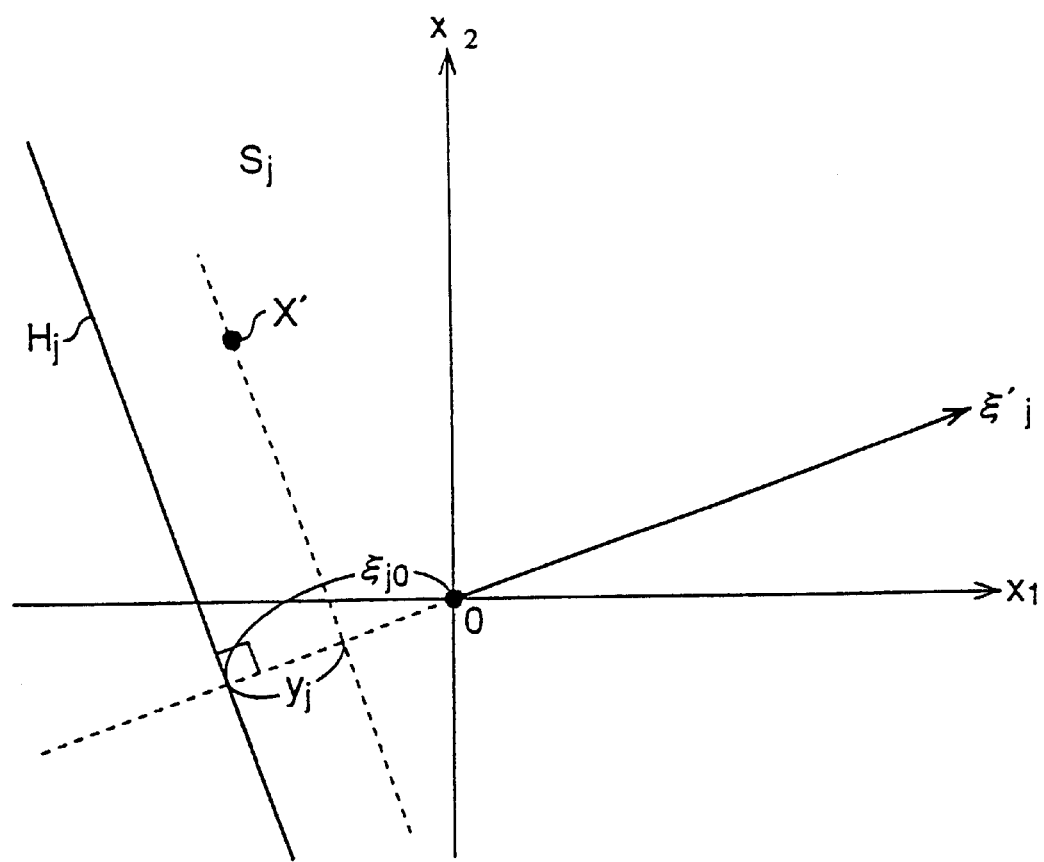
FIG. 2 is a view showing a setting of a distance from a boundary of a solution region to a certain parameter value.
Figure 3:
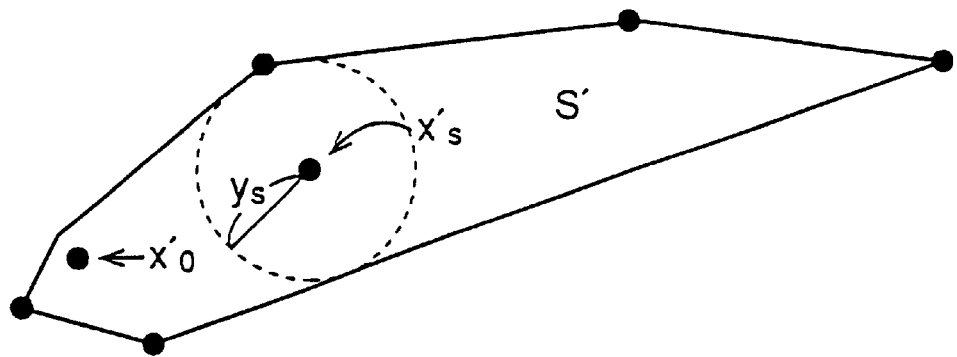
FIG. 3 is a view showing a comparison of a maximal robust solution with a solution obtained by a conventional method.

Referring to FIGS. 2 and 3, one example of determining an existence of the solution region S and finding the most robust solution $X_s$, based on a linear programing method, will be explained. For the sake of simplifying the description, all the vectors of $\eta^-(x_i), \eta^-(x_i)$ and $\eta_0(x_i)$ used in the above-mentioned inequality systems (10), (11) and (12) are correspondingly expressed by new vectors Tlil (j=1, 2, ..., 3n). Thus, inequality systems (10), (11) and (12) are represented by the following equivalent inequality system (14):

$$(X, \eta_j) > 0 \; (j=1, 2, \ldots, 3n) \tag{14}$$

Herein:

$$\eta_i = \eta^+(x_i)(i=1, 2, \ldots, n) \tag{15}$$

$$\eta_{i+n} = \eta^-(x_i) \tag{16}$$

$$\eta_{i+2n} = \eta_0(x_i) \tag{17}$$

Also, a representation of $\eta_j$ by components is put as $(\eta_{j0}, \eta_{j1}, \eta_{j2}, \eta_{j3})$.

In inequality system (14), even if the parameter vector X is multiplied by $\alpha$, the following inequality system (18) stands:

$$(\alpha X, \eta_j) = \alpha(X, \eta_j) > 0 \tag{18}$$

Therefore, even if X is multilplied by $(1/a_0)$ and the following is set;

$$X'' = (1/a_0)X = (1, a_1/a_0, b_1/a_0, b_1/a_0),$$

the generality cannot be lost.

Accordingly, the above inequality system (14), expressed by the inner products of the 4-dimensional vectors, is reduced to the following inequality system (19), expressed by the inner products of the 3-dimensional vectors:

$$0 < (X'', \eta_j) = \eta_{j0} + (X', \eta'_j) \tag{19}$$

Herein: X' and $\eta'_j$ are set as follows:

$$X' = (X'^{(1)}, X'^{(2)}, X'^{(3)}) = (a_1/a_0, b_0/a_0, b_1/a_0)$$

$$\eta'_j = (\eta_{j1}, \eta_{j2}, \eta_{j3})$$

A solution region S' of inequality system (19) is expressed as follows:

$$S' = \{s_1 X'_1 + s_2 X'_2 + \ldots + s_m X'_m | s_1, s_2, \ldots, s_m > 0, s_1 + s_2 + \ldots + s_m = 1\} \tag{20}$$

herein: $X'_k$ (k=1, 2, ..., m) is a 3-dimensional vector expressing a vertex of the solution region S'.

A point of the most robust solutions is obtained from the solution region S'. To this end, first, a distance from a boundary of the solution region S' is set. If j is fixed, inequality (19) geometrically expresses a half-space $S_j$ with a boundary which is the following plane $H_j$ in $R^3$ (orthogonal coordinates of real 3-components):

$$H_j : f_{j0} + (X', f'_j) = 0 \tag{21}$$

Herein: $f'_j$ is a normal-direction vector of $H_j$; and $S_j$ exists on the side of the direction of $f'_j$. Since a region, on which inequality (19) stands for any j, is a solution region in $R^3$-space, the solution region S' is the intersection of each $S_j$ (S'=$S_1 \cap S_2 \cap$ ...), and the boundary of S' is the parts of $H_1$, $H_2$, ...

Again, j is fixed. If a vector X' is in $S_j$, and if the distance from $H_j$ to X' is $y_j$, the following equation (22) stands:

$$y_j |\eta'_j| = \eta_{j0} + (X', \eta'_j)(|\eta'_j| = (\eta_{j1}^2 + \eta_{j2}^2 + \eta_{j3}^2)^{1/2}) \tag{22}$$

For the sake of rearrangement, the equation (22) is divided by $|\eta'_j|$ as a whole. Then, if settings of $\xi_{j0} = \eta_{j0}/|\eta'_j|$ and $\xi'_j = \eta'_j/|\eta'_j|$ are given, the equation (22) can be expanded as follows:

$$y_j = \xi_{j0} + (X', \xi'_j) \tag{23}$$

This aspect is shown in FIG. 2 (note, in this drawing, the case of $\xi'_{j3} = 0$ is illustrated for the sake of simplicity). As shown in FIG. 2, the right side region of $H_j$ is $S_j$, and X' is on a dashed line parallel to $H_j$.

Although the above-mentioned formulation with respect to the distance is established for one fixed j, a distance y from the boundary of S' to the vector X' with respect to all of j can be defined by the following:

$$y = \min(Y_1, Y_2, \ldots) \tag{24}$$

The formulation implies that a distance from any one of $H_j$ to X' is at least y. In other words, if a distance from X' to any one of $H_j$ is equal to or more than $y \leq y_j$ stands, and from (23) the following stands:

$$y \leq \xi_{j0} = (X', \xi'_j)(j=1, 2, \ldots) \tag{25}$$

The most robust solution is the farthest solution from the boundary of the solution region S', because the most robust solution is defined as a set of parameter values with the largest allowable deviations. In inequality system (25), y is a lower limit of the distance from the boundary, thus X', maximizing y, is farthest from the boundary. Thus, the solution method of the most robust solution is reduced into a linear programming maximizing method by which the subject value y is maximized under the constraint condition of inequality system (25).

The most robust solution $X'_s$ and the maximal distance $y_s$ represents a disc part of the solution region having a center $X'_s$ and a radius $Y_s$. Thus, $y_s$ implies a quantitative robustness ($y_s$ is referred to as a robust radius hereinafter).

In a conventional method, for example, instead of inequality system (25), a linear programming method was used, having the following constraint condition:

$$y \leq \eta_{j0} + (X', \eta'_j) (j=1, 2, \ldots)$$

Namely, X', maximizing y under a condition of y>0, was found. Nevertheless, this y does not represent a distance from the boundary, and is merely introduced as an artificial-subject-variable for the purpose of obtaining a solution. Therefore, generally, it is impossible to obtain a robust solution.

FIG. 3 shows a comparison of the conventional solution with the solution obtained by this embodiment. In FIG. 3, S' is 2-dimensionally illustrated for the sake of simplicity. The solution $X'_0$ is obtained from the conventional method, and may be out of the solution region S' even due to a small variation of the parameter values. On the contrary, $X'_s$ is the most robust solution, and, even when a deviation is introduced into the parameter values, the set of parameter values still remains in the solution region S' if a level of the deviation is less than $y_s$.

In the above-mentioned embodiment, the unique most robust solution is found, one solution or more than one solution, which have a robustness larger than a predetermined level, may be found (if existing). For example, by setting a relative level of robustness "a" (0<a<1) and by putting a disc neighborhood of the most robust solution $X'_s$, with radius $y_s \times a$, a solution region with a level of robustness $y_s \times (1-a)$ may be obtained.

Further, instead of using the maximizing condition for y, by setting an absolute level of robustness $y_0$, another suiting problem may be established; it makes solve simultaneously inequality system (25) and the following inequality condition that the robustness is more than $y_0$ as follows:

$$y_0 \leq y.$$

In this case, it is possible to obtain a solution region having a higher level of robustness than $y_0$. Note, it is possible to suitably determine the above values "a" and "$y_0$" in accordance with levels of variations of parameter values with respect to an objective system.

From the most robust solution $X'_s = (X'_{s1}, X'_{s2}, X'_{s3})$ obtained in $R^3$, the following parameter vector is produced:

$$X_s = (\alpha, \alpha X'_{s1}, \alpha X'_{s2}, \alpha X'_{s3}) (\alpha > 0)$$

Thus, by substituting the parameter vector $X_s$ in the equation (2), it is possible to obtain most robust suiting functions.

An described above, according to this embodiment, the following effects are obtained:

[1] It is possible to find the most robust suiting functions against variations of the parameter values;

[2] It in possible to quantitatively determine a level of the robustness.

Note, if there is no solution region S' for the linear programming problem on inequality system (25) or if $y_s < 0$, there is no solution region S for the original suiting problem.

Namely, by solving a feasible problem of the linear programming problem of inequality system (25), it is possible to determine whether or not the suiting function exists.

In the above-mentioned ezbodant, the formulation (24) of the distance is merely shown by way of example. For example, by using a symmetric positive-definite matrix (metric matrix) gkl(k, l=1, 2, 3), in the parameter space, a "length |Y|" of a vector Y may be defined as follows:

$$|Y| = (\Sigma^3_{k,l=1} g_{kl} Y_k Y_l)^{1/2}$$

and, instead of the equation (22), the distance from the boundary $H_j$ to X' is the following:

$$y_j = (\xi_{j0} + (X', \xi'_j))/|\xi'_j| \qquad (26)$$

Similar to the relationship (25), if X' maximizing y is found under the constraint condition:

$$y \leq (\xi_{j0} + (X', \xi'_j))/|\xi'_j| (j=1, 2, \ldots) \qquad (27)$$

the most robust solution can be obtained in the sense of the weighted distance defined by $g_{kl}$. The definition of the above-mentioned distance is effective in the cases where there are differences among the variations of the parameter values, for example, where the parameter value $X_1$ varies more greatly than the parameter value $X_2$.

It is easy to expand the procedures of "1. Reduction of problem of suiting method to inequality system" and "2. Solution method of robust solution" described above with respect to a case where the rational function (2) is generalized to the ratio of linear combinations of two sets of linear independent functions $(p_0(x), p_1(x), \ldots, p_M(x))$ and $(q_0(x), q_1(x), \ldots q_n(x))$ an the domain D in the n-dimensional space as follows:

$$f(x) = (a_0 p_0(x) + a_1 p_1(x) + \ldots + a_M p_M(x))/(b_0 q_0(x) + b_1 q_1(x) + \ldots + b_N q_N(x))$$

Herein: $a_0, a_1, \ldots, a_M, b_0, b_1, \ldots$ and $b_N$ are real parameters; x is an n-dimensional vector; and $p_0(x), p_1(x), \ldots, p_M(x), q_0(x), q_1(x), \ldots$ and $q_N(x)$ are piecewisely continuous functions on the domain D, such as $x^n$, cos x, $e^x$ or stop functions, etc.

In the above-mentioned embodiment, with respect to the suiting problem for the ratio of two linear expressions in the parameters, the most robust solution has been found. Even for a general suiting problem being non-linear in the parameters, if a distance from the boundary can be adequately defined, the problem can be reduced into a non-linear optimizing problem for this distance. Also in this case, by solving the optimizing problem, the most robust solution can be obtained.

EMBODIMENT 2

Embodiment 2 of the present invention will now be described. In this embodiment, there is shown a method for selecting the most robust solution from a solution region of parameter values or a part thereof when the region is previously expressed by a formulation similar to the set (20). For the sake of simplicity, S' of the set (20) is used as the original solution region here. Note, a similar procedure is possible even in a higher dimensional case.

Figure 4:
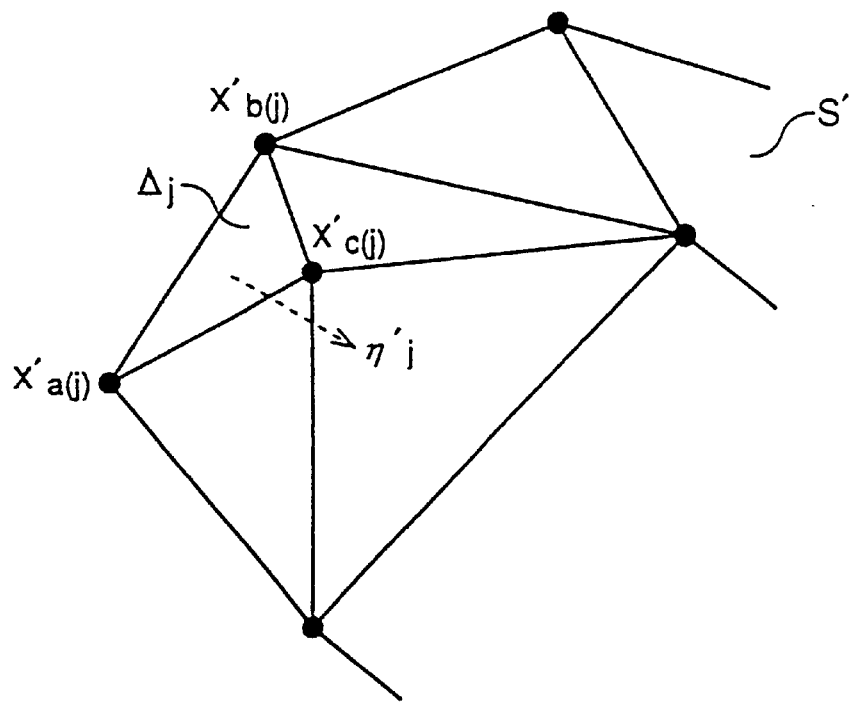
FIG. 4 is a view showing Embodiment 2 of the present invention.

Since S' exists in 3-dimensional space, in general, its boundary can consist of connected triangles $\Delta_j$, as shown in FIG. 4. From vertex vectors $X'_{a(j)}$, (j), $X'_{b(j)}$, $X'_{c(j)}$ of each $\Delta_j$, a vector $\eta'_j$ ($\neq 0$), orthogonally intersecting $\Delta_j$ is calculated. Namely, the vector $\eta_j$, which is directed to the solution region S', is calculated so as to satisfy the following;

$$(\eta'_j, X'_{b(j)} - X'_{a(j)}) = (\eta'_j, X'_{c(j)} - X'_{a(j)}) = 0.$$

If $y_j$ is set as a distance from $X'$ to a plane $H_j$ containing $\Delta_j$, the following relationship holds:

$$y_j |\eta'_j| = -(\eta'_j, X'_{a(j)}) + (X', \eta'_j) \quad (28)$$

By letting $\eta'_j = -(\eta'_j, X'_{a(j)})$, the equation (28) becomes equivalent to the equation (22). Accordingly, the most robust solution can be obtained in the same manner as in the item "2. Solution method of robust solution" of Embodiment 1.

As is apparent from the foregoing, according to the present Embodiment 2, in the case where the solution region is previously given, the most robust solution can be selected from the solution region of parameter values. Also, according to this method, it is possible to obtain easily the each most robust solution from a same solution region, in accordance with a change of robustness (for example, by changing a distance function).

EMBODIMENT 3

Figure 5:
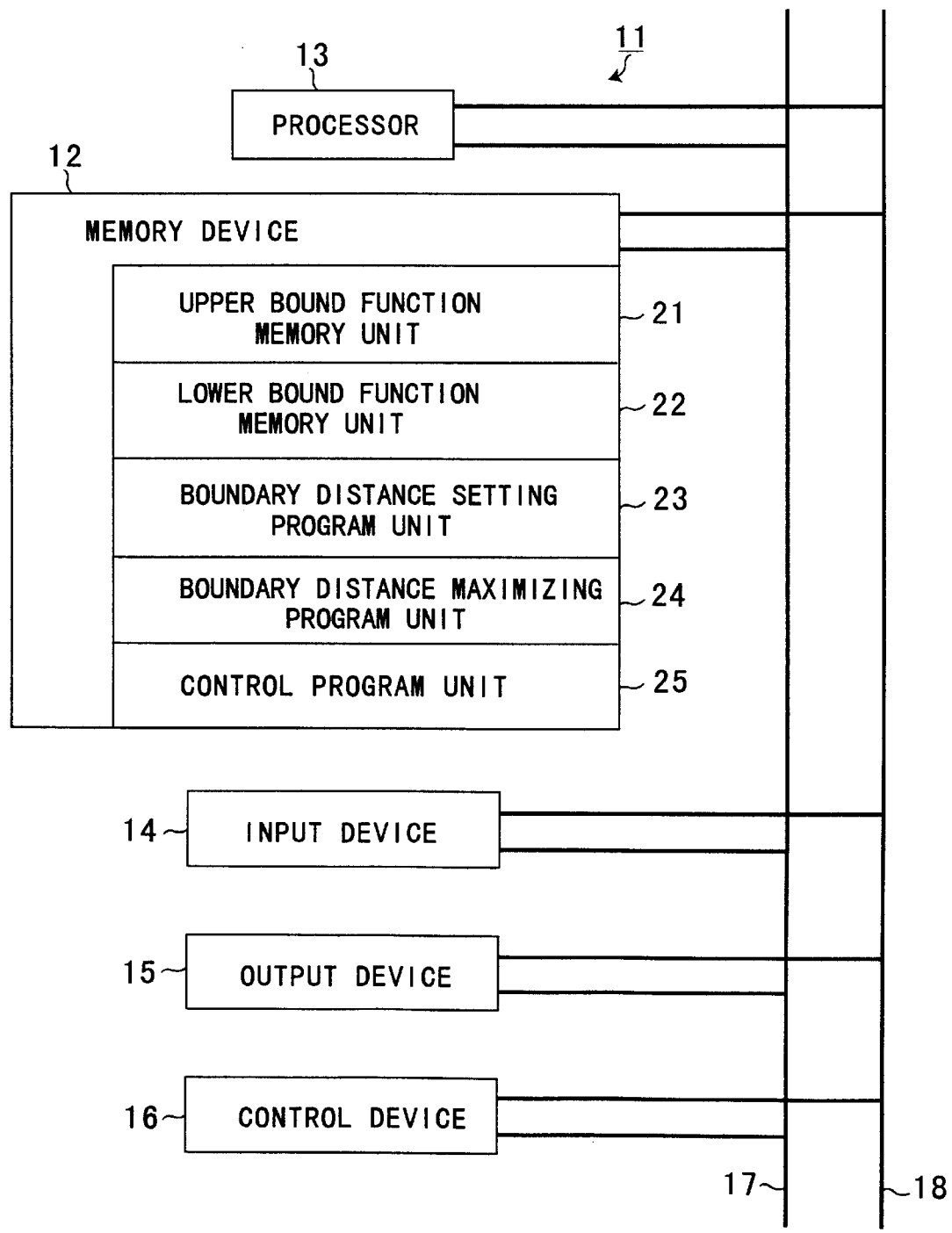
FIG. 5 is a block diagram of the structure of Embodiment 3 of the present invention.

FIG. 5 shows, as Embodiment 3, a schematic structure of an apparatus which executes the suiting method to obtain the most robust solution. The apparatus 11 is, for example, a digital computer, and comprises a memory device 12, a processor 13, an input device 14, an output device 15, and a control device 16, and these elements are mutually connected to each other through bus lines 17 and 18. The memory device 12 includes: a storage area for storing upper bound function $Me^{+(x}_i)$, i.e. an upper bound function memory unit 21; a storage area for storing lower bound function $M^-(x_i)$, i.e. a lower bound function memory unit 22; a storage area for storing a program to set a distance from a boundary of a solution region, i.e. a boundary distance setting program unit 23; a storage area for storing a program to obtain a solution maximizing a boundary distance, i.e. a boundary distance maximizing program unit 24; and a storage area for storing a control program, such as an OS, i.e. a control program unit 25. The processor 13 is a CPU or such like. The input device 14 is, for example, a keyboard, a mouse, a numerical file, a digitizer, or a light pen. The output device 15 is, for example, a display, a numerical file, a plotter, or a printer. The control device 16 controls the respective devices for executing the program.

Figure 6:
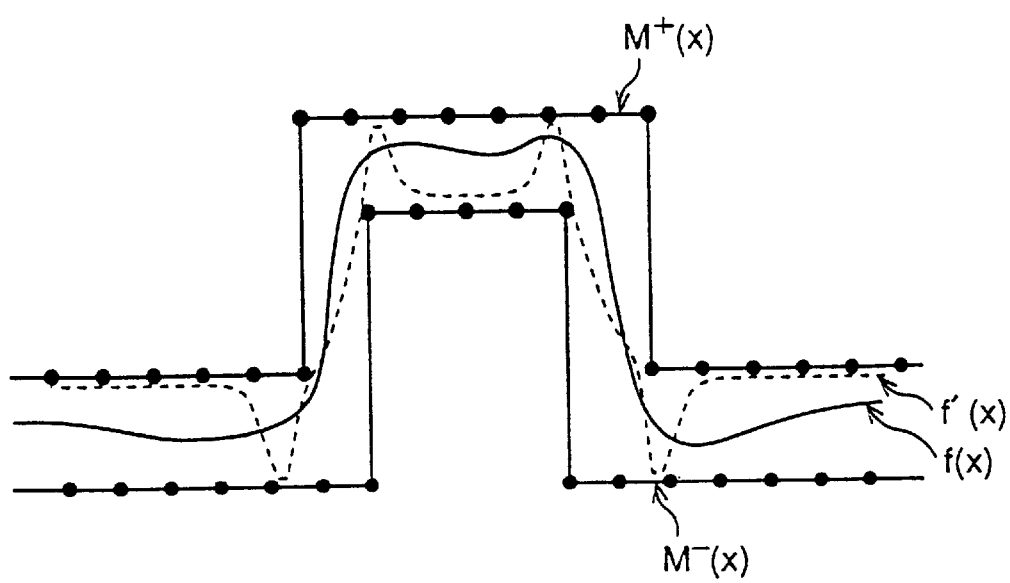
FIG. 6 is a view of an output screen displaying a suiting function obtained by Embodiment 3 of the present invention.

FIG. 6 shows an example of the data displayed on the screen of a display of the output device 15. Upper bound function $M^+(x_i)$ and lower bound function $M^-(x_i)$ are set based on the sequence of points given via the input device 14. A suiting function $f(x)$ found by the suiting method is the following rational function (29) with the denominator and the numerator respectively expressed by fourth-degree polynomials:

$$f(x) = (A_0 + A_1 x + A_2 x^2 + A_3 x^3 + A_4 x^4)/(B_0 + B_1 x + B_2 x^2 + B_3 x^3 + B_4 x^4) \quad (29)$$

Herein: $A_0$, $A_2$, $A_3$, $A_4$, $B_0$, $B_1$, $B_2$, $B_3$, and $B_4$ are real parameters.

In FIG. 6, a broken line exhibits a suiting function $f'(x)$ with a small robustness, and a solid line exhibits a most robust function $f(x)$. As is apparent from this, a robustness of the suiting function gives a smoothness to the suiting function per se.

Note, the function (29) represents a squared amplitude characteristic of a digital band pass filter. This will be stated in detail in Embodiment 5.

As described above, according to the suiting apparatus of the present embodiment, the effects similar to those of Embodiment 1 are obtained. Also, the suiting apparatus of this embodiment has a structure for visually displaying the upper boundary and lower boundary of the suiting region on a screen of the display and, at the same time, displaying the most robust suiting function $f(x)$ on this displayed suiting region in an overlapping manner. Accordingly, a correlation between the suiting function and the spread of the input data can be directly and visually understood, and a past labor to select a suiting function can be saved. Therefore, in a case where the suiting method is applied to, for example, a system design, even if a user does not have detailed knowledge of the object system, it is possible for a user to obtain efficiently a design result, which guaranteed engineering stability, merely by visually estimating the design result and visually instructing changes of specifications and so on.

EMBODIMENT 4

In this embodiment, a procedure for finding at least one suiting function having a minimum degree will now be described.

In general, regarding the same suiting region, a higher-degree suiting function has higher robustness. Thus, it is possible to obtain the minimum-degree suiting function with a desired robustness, by determining an existence of a suiting function, which satisfies the desired robustness, by changing a degree of the function. The robustness is represented by, for example, a robust radius, and is set by a suitable input means (such as the input device 14 in FIG. 5).

Figure 7:
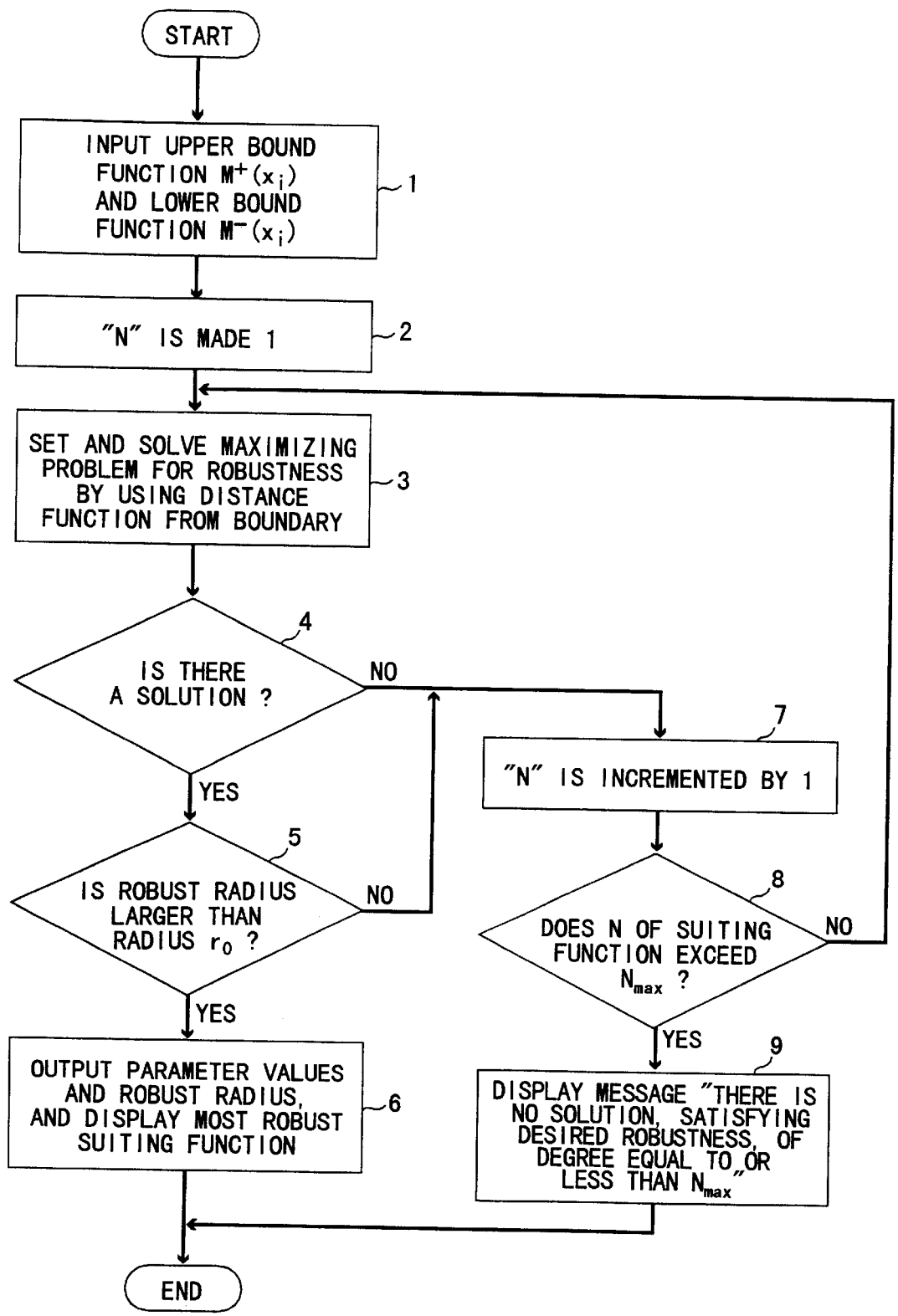
FIG. 7 is a flow chart showing an operation of Embodiment 4 of the present invention.

One example of the procedure is shown in the flow chart of FIG. 7, and will be described below.

At step 1, an upper bound function and a lower bound function are inputted. At step 2, an initial value of the degree N is made "1". At step 3, a maximizing problem for the robustness is set and is solved by using a distance function, similar to inequality system (25), which represents a distance from the boundary. At step 4, if a solution, which satisfies the constraint condition, does not exist, the routine proceeds to step 7, and if the solution exists, the routine proceeds to step 5. At step 5, if the robust radius of the obtained solution is smaller than a previously-desired robust radius rot the routine proceeds to step 7, and if larger, the routine proceeds to stop 6. At step 6, a set of parameter values, satisfying the desired robustness, and a robust radius thereof are outputted, and the most robust function is displayed as a graph on the display. Thus, the routine ends.

At step 7, the degree N of the suiting function is incremented by one, because the solution does not exist or does not satisfy the desired robustness. At step 8, if the degree N of the suiting function exceeds the maximum degree Nmax, which can be realized by the apparatus, the routine proceeds to step 9, and, if else, the routine returns to step 3, in which and a most robust function is again searched for. At step 9, a message, for example, "THERE IS NO SOLUTION, SATISFYING DESIRED ROBUSTNESS, OF DEGREE EQUAL TO OR LESS THAN Nmax" is displayed, and thus the routine ends.

Note that, the above-mentioned procedure merely shown a simple algorithm, by way of example, and it is possible to carry out the procedure at a high speed by introducing an algorithm, such as a dichotomy or the like.

Incidentally, the present invention is applicable to various fields, where the suiting method can be used, such as engineering systems represented by transfer functions of analog systems and digital systems in the frequency domain, and engineering systems represented by recursion relations and differential equations allowing non-linear elements and time-variant elements in the time domain, and so on. Also, the present invention is applicable to not only a system design but also an identification of systems or the like.

In all applicable fields and aims, according to the present invention, a most robust suiting function can be similarly obtained, and gives an individually-significant merit to each of the fields and aims. So, two typical applications of the present invention: a design method for an amplitude characteristic of a digital filter in the frequency domain (Embodiment 5), and an identification of systems in the time domain (Embodiment 6) will be described hereinafter.

The design method and the identification method, shown in the following two embodiments, are easily applicable to various systems in engineering, (such as other physical systems including a linear-phase filter, an all-pass filter, analog systems, etc., and signal-processing systems including for example a data-compressing system), only if ways to provide suiting regions are modified using the known techniques. The ways to provide suiting regions of "a linear-phase filter", of "an all-pass filter", of "analog systems", and of "a data-compressing system" are disclosed in the specification of Unexamined Japanese Patent Publication (HEI) 7-226656. Namely, the way to provide a suiting region of "a linear-phase filter" is disclosed in paragraph [0093]; the way to provide a suiting region of "an all-pass filter" is disclosed in paragraphs [0094] to [0098]; the way to provide a suiting region of "analog systems" is disclosed in paragraphs [0099] to [0109]; and the way to provide a suiting region of "a data-compressing system" is disclosed in paragraphs [0110] to 0125], respectively.

EMBODIMENT 5

In this embodiment, a transfer function of a digital filter is designed from a given frequency-amplitude characteristic. For the sake of simplicity, the sampling period T is normalized as 1. In the design, only the amplitude characteristic is specified neglecting the phase characteristic. The domain, on which the characteristic should be specified, is set as $D_0$:

$$D_0 = \{0 \leq \Omega \leq \pi\}$$

Although a degree of the transfer function can be arbitrarily set, an explanation will be made of a case where each of the numerator and the denominator of the transfer function is of the 4th-degree.

Transfer function $H(z)$ is defined as follows:

$$H(z)=(a_0+a_1 z^{-1}+a_2 z^{-2}+a_3 z^{-3}+a_4 z^{-4})/(b_0+b_1 z^{-1}+b_2 z^{-2}+b_3 z^{-3}+b_4 z^{-4})=P(z)/Q(z) \quad (30)$$

The numerator and the denominator are set as $P(z)$ and $Q(z)$, respectively, as described above. The definition (30) relates to the transfer function of an IIR filter, but, in the case of an FIR filter, it is sufficient if $Q(z)=b_0$.

For the sake of simplicity of calculation, the amplitude characteristic is indicated by a square amplitude characteristic. When substituting $z=e^{j\omega}$ in $H(z)$, the square amplitude characteristic of the filter is defined by $H(e^{j\omega}) H^*(e^{j\omega})$ as follows (* indicates the complex conjugate):

$$H(e^{j\omega})H^*(e^{j\omega})=H(e^{j\omega})H(e^{-j\omega})=(A_0+A_1 \cos\omega+A_2 \cos^2\omega+A_3 \cos^3\omega+A_4 \cos^4\omega)/(B_0+B_1 \cos\omega+B_2 \cos^2\omega+B_3 \cos^3\omega+B_4 \cos^4\omega)$$

This square amplitude characteristic is expressed as a function in $\cos\omega$ as shown above. The numerator and denominator are set as $p(\cos\omega)$ and $q(\cos\omega)$ respectively, and $f(\cos\omega)$ is set as $p(\cos\omega)/q(\cos\omega)$. $A_0, A_1, A_2, A_3$ and $A_4$ are the quadratic polynomials of $a_0, a_1, a_2, a_3$ and $a_4$, and $B_0, B_1, B_2, B_3$ and $B_4$ are the quadratic polynomials of $b_0, b_1, b_2, b_3$ and $b_4$. Note, the explanation made here uses $\cos^k\omega$ ($k=0, 1, \ldots$) as a set of the base functions, but the set of the base functions is not necessarily restricted to these. For example, $\cos k\omega$ ($k=0, 1, \ldots, 4$) may be used as another set of the base functions for the suiting on the domain $D_0$. Upper bound function $M^+(\cos\omega)$ and lower bound function $M^-(\cos\omega)$, expressing a desired range of the square amplitude characteristic, are given on the domain $D_0$, Since the range of $\cos\_$ on $D_0$ is from $-1$ to $+1$, letting $x=\cos\omega$ and $D=\{-1 \leq x \leq 1\}$, the suiting is executed by the following determinating inequality system:

$$M^+(x)<f(x)=p(x)/q(x)<M^-(x) (x \in D)$$

$$0<q(x) (x \in D)$$

Herein: the positive-valued condition of $q(x)$ is necessary for the stability of the filter. From this, by using the above-mentioned suiting method to obtain the most robust solution, a set of the parameter values $A_0, A_1, A_2, A_3$ and $A_4$, and $B_0, B_1, B_2, B_3$ and $B_4$ of $f(x)$ are obtained. By using suitable factorizations of the thus obtained square amplitude characteristic $p(x)/q(x)$, the corresponding transfer function $P(z)/Q(z)$ can be obtained.

Note, in the execution of the suiting, generating convex hulls (cf. paragraphs [0048] to [0078] of Unexamined Japanese Patent Publication (HEI) 7-226656) may be utilized to obtain a suiting region with higher precision or more robustness. This embodiment also may be used for an identifuncation of an object system by setting a measured frequency characteristic of this system as a suiting region.

As described above, even if a variation, which has a level corresponding to the robust radius, is introduced into the set of parameter values obtained in accordance with this embodiment, the frequency characteristic of the filter still remains within the suiting region. This implies that, with respect to a design of digital filters, if a level of quantumization noises of the coeffuncients and the input signal is less than the robust radius, a frequency characteristic falls in an allowable range of the specifuncation. Thus, in a case of a design of a fixed-point digital filter, for example, by using the procedure in Embodiment 4 under a condition that a robust radius is more than a level of the quantumization noises, it is possible to design a transfer function, which is of the minimum degree and which is free from deterioration resulting from the quantumization of coeffuncients and input signals.

Also, a similar method can be applied to a design of an analog system under a condition that the robust radius is greater than a level of an aging-deviation or a temperature-deviation of characteristics of each of the parts, whereby the characteristics can be prevented from being subjected to deterioration derived from the deviations.

EMBODIMENT 6

Figure 8:
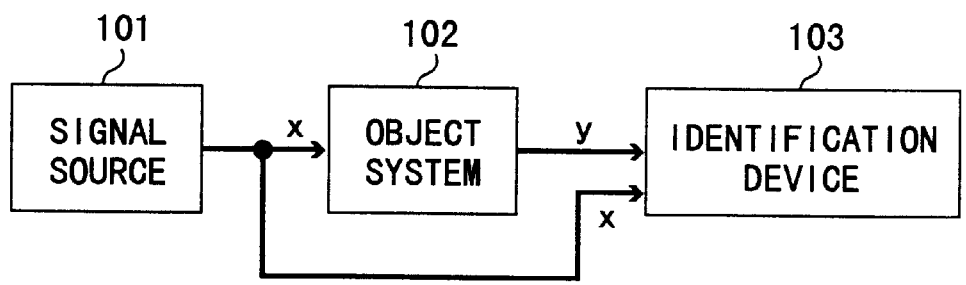
FIG. 8 is a block diagram of an identification system of Embodiment 6 of the present invention.

In this eabodiment, a method of system-identifuncation in a time domain will be described. As shown in FIG. 8, in a case where an object system 102 receives a signal x from a signal source 101, and then responds to the signal x with a signal y, in order to identify the object system 102, a model is estimated from the signals x and y by an identifuncation apparatus 103. The signals x and y are discretized, with n-th signals being represented by $x_n$ and $y_n$, respectively.

When the object system 102 is set, with using suitable functions $f_i$, as follows:

$$S_y = \Sigma^L_{i=0} a_i f_i(y'_n, x'_n)$$

parameters $a_i$ are determined, assuming that it is approximately represented by $S_y=0$ Herein: $\Sigma$ expresses a sum of 0 to L for i, and respective $y'_n$ and $x'_n$ are set as:

$$y'_n = (y_n, y_{n-1}, \ldots, y_{n-M})$$

$$x'_n = (x_n, x_{n-1}, \ldots, x_{n-M})$$

$f_0, f_1, \ldots$ and $f_L$ are mutual linearly-independent functions. $f_i(y'_n, x'_n)$ may be non-linear in the arguments $y'_n$ and $x'_n$, and may depend on n (namely, the system is time-variable).

Further, the following definitions are made:

$$X' = (a_0, a_1, \ldots, a_L),$$

$$\eta_n = (f_0(y'_n, x'_n), f_1(y'_n, x'_n), \ldots, f_L(y'_n, x'_n))$$

The respective lower bound function and upper bound function of allowable errors for $S_y$ are expressed by $M^-(n)$ and $M^+(n)$, which, for example, are derived from measurement errors. In this case, the determinating inequality system for the suiting is as follows:

$$M^-(n) < S_y(X', Y'_n, x'_n) < M^+(n) (n=0, 1, \ldots)$$

Then, this is expressed as follows:

$$M^-(n) < S_y(X', \eta_n) < M^+(n)$$

Subsequently, by suitably carrying out transpositions, it can be reduced into an inequality system in X', similar to inequality system (19). Thus, in a manner similar to the case of Embodiment 1, it is possible to obtain the set of most robust parameter values $X'_s$.

In the above-mentioned identifuncation, the signal x may not necessarily be used. Also, the identifuncation may be executed for not only one response of the object system to one signal, but also responses to some different signals. Also, by utilizing the above-mentioned generating convex hull for the suiting, it is possible to provide a more robust suiting region against measurement errors and some noises. Further, in the case of an analog system, it is possible to absorb quantumization errors in the generating convex hull. Yet further, it is possible to apply this embodiment to a design of a system in a time domain by setting a desired time-behavior as the suiting region.

As described above, even when deviations, which have a level corresponding to the robust radius, is introduced into the identified parameter values obtained in accordance with this mbodiment, a behavior of a model still remains within the suiting region. The identified result is most robust against the parameter deviations, among models representing the object system. Thus, in a case where a modeling of an object system rather than an identifuncation by a fixed-point digital filter is merely carried out without taking a degree of the system into consideration, it is possible to obtain a modeling, which is free from deterioration resulting from the quantumization of coeffuncients and input signals, under a condition that a robust radius is greater than a level of quantumization noises, similar to the above-mentioned embodiment.

The obtained robust radius represents a lower limit of the spread of the identifuncation results. Namely, the spread of the identifuncation results is at least larger than the robust radius. Accordingly, the robust radius can be utilized for estimating the precision of the identifuncation. Also, it is possible to obtain an upper limit of the spread of the identifuncation results by forming a convex hull to include the solution region, for example, by calculating the maximums and the minimums of the parameter values.

INDUSTRIAL UTILITY

As is apparent from the foregoing, according to a suiting method and a suiting apparatus of the present invention, on various utilizable problems in industry, such as construction or form of physical systems, identifuncation of systems, display of graphs, data interpolation, signal prediction modeling, pattern recognition, and so on, it is possible to handle input data with a certain spread, which was conventionally diffuncult. Also, by selecting more or most robust solutions from the parameter values of the suiting function, it is possible to construct a higher-robust system against the deviations.

What is claimed is:

1. A computer system that determines a set of parameter values of a physical system exhibiting physical characteristics, comprising:
    an input device that inputs physical characteristics;
    a memory device that stores a suiting region corresponding to an allowable range of said physical characteristics;
    a setting device that sets said suiting region, input via said input device, in said memory device; and
    a processor/controller that executes a calculation to find a suiting function, contained in said suiting region, by solving simultaneous inequalities, said processor/controller including a first setting system that sets said suitng function as a family of functions with parameters corresponding to the parameters of said physical system, a second setting system that sets a distance from a boundary of a solution region of the parameters of said suiting function, corresponding to a boundary of said suiting region, and a solution system that solves said siutaneous inequalities so that said distance is maximized thereby determining a robust set of parameter values of said physical system.

2. A computer system as set forth in claim 1, wherein said processor/controller further comprises a finder that finds approximate distances from the boundary of the solution region of said parameters to parameter values of said physical system.

3. A computer system as set forth in claim 1, wherein said suiting function comprises a transfer function of an engineering system.

4. A computer system as set forth in claim 1, wherein said suiting function comprises a recursion relation of an engineering system.

5. A computer system as set forth in claim 1, further comprising an output device including:
    a suiting-region-display that displays said suiting region; and
    a suiting-function-display that displays said suiting function over said suiting region displayed by said suiting-region-display.

6. A computer system that selects a set of parameter values of a physical system exhibiting physical characteristics, comprising:
    an input device that inputs a family of suiting functions with parameters corresponding to the parameters of said physical system, said family of suiting functions being contained in a suiting region corresponding to an allowable range of physical characteristics;

a memory device that stores said family of suiting functions; and a process/controller that selects a suiting function from said family of suiting functions by solving simultaneous inequalities, said processor/controller further comprising a distance setting system that sets a distance from a boundary of a solution region of the parameters of said suiting function, corresponding to a boundary of said suiting region, a solution system that solves said simultaneous inequalities so that said distance is maximized, thereby determining robust a robust set of parameter values of said physical system.

7. A suiting process performed by a computer system, said comnputer system comprising an input device, a memory device and a processor/controller, to determine a set of parameter values of a physical system exhitibing physical characteristcs, said process comprising:

inputting physical characteristics via said input device;

setting a suiting region, corresponding to an allowable range of said input physical characteristics, in said memory device; and finding a suiting function, contained in said suiting region, by solving simultaneous inequalities using said processor/controller by:

setting said suiting function as a family of functions with parameters corresponding to the parameter of said physical system;

setting a distance from a bounds of a solution region of the parameters of said suiting function, corresponding to a boundary of said suiting region; and solving said simultaneous inequalities so that said distance is maximized, hereby determining a robust set of parmeter values of said physical system.

8. A suiting process as set forth in claim 7, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

9. A suiting process performed in a computer system that includes an input device, a memory device, an output display device and a processor/contoller, to determine and display a set of parameter values of a physical system exhibiting physical characteristics, said process comprising:

inputting physical characteristics via said input device;

setting a suiting region, corresponding to an allowable range of said physical characteristics, in said memory device;

displaying said suiting region on said output display device;

finding a suiting function, contained in said suiting region, by solving simultaneous inequalities using said processor/controller by:

setting said suiting function as a family of functions with parameters corresponding the parameters of said physical system;

setimg a distance from a boundary of a solution region of the parameters of said suiting function, corresponding to a boundary of said suiting region; and solving said simultaneous inequalities so that said distance is maximized, thereby determining a robust set of parameter values of said physical system; and displaying said suiting function on said suiting region displayed on said output display device.

10. A suiting process as set forth in claim 9, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

11. A suiting processing performed in a computer system including an input device, a memory device, an output display device and a processor/controller that select a set of parameter values of a physical system exhibiting physical characteristics, said process comprising:

inputting a family of suiting functions with parameters corresponding to the parameters of said physical system, via said input device, said family of suiting functions being contained in a suiting region corresponding to an allowable range of physical characteristics;

storing said family of suiting functions in said memory device; and selecting a suiting function from said family of suiting functions by solving simultaneous inequalities, using said processor/controller, said selecting further comprising:

setting a distance from a boundary of a solution region of the parametes of said suiting function, corresponding to a boundary of said suiting region; and solving said simultaneous inequalites so that said distance is maximized, thereby selecting a robust set of parameter values of said physical system.

12. A suiting process as set forth in claim 11, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and engineering system represented by a differential equation in time domain.

13. A memory medium that stores a suiting program executed in a computer system including an input device, a memory device, and a processor/controller to determine a set of parameter values of a physical system exhibiting physical characterstics, said program comprising:

inputting physical characteristics via said input device;

setting a suiting region, corresponding to an allowable range of said input physical characteristics, in said memory device; and finding a suiting function, contained in said suiting region, by solving simultaneous inequalities, using said processor/controller by:

setting said suiting function as a family function with parameters corresponding to the parameter values of said physical system;

setting a distance from a boundary of a solution region of the parameter of said function, corresponding to a boundary of said suiting region; and solving said simultaneous inequalities so that said distance is maximized, thereby determining a robust set of parameter values of said physical system.

14. A memory medium as set forth in claim 13, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

15. A memory mediun that stores a suiting program executed in a computer system including an at device, a memory device, an output display device and a processor/controller, to determine and display a set of parameter values of a physical system exhibiting physical characteistics, said program comprising:

inputting physical characteristics via said input device;

seting a suiting region, corresponding to an allowable range of said input physical characteristics, in said memory device, displaying said suiting region on said output display device;

finding a suiting function, contined in said suiting region, by solving simultaneous inequalities, using said processor/controller by:

setting said suiting function as a family of functions with parameters corresponding to the parameters values of said physical system;

setting a distance from a boundary of a solution region of the parameters of said suiting function, corresponding to a boundary of said suiting region; and solving said simultaneous inequalities so that said distance is maximized, thereby determining robust a robust set of parameter values of said physical system; and displaying said suiting function on said suiting region displayed on said output display device.

16. A memory medium as set forth in claim 15, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

17. A memory medium that stores a suiting program executed in a computer system including an input device, a memory device and a processor/controller that select a set of parameter values of a physical system exhibiting physical characteristics, said program comprising:

inputting a family of suiting functions with parameters corresponding to the parameters of said physical system, via said input device, said family of suiting functions being contained in a suiting region corresponding to an allowable range of physical characteristics;

storing said family of suiting functions in said memory device; and selecting a suiting function from said family of suiting functions by solving simultaneous inequalities using said processor/controller, wherein said selecting of said suiting function comprises:

setting a distnce from a boundary of a solution region of the parameters of said suiting function, corresponding to a boundary of said suiting region; and solving said simultaneous inequalities so that said distnce is maximzed, thereby selecting robust a robust set of parameter vahles of said physical system.

18. A memory medium as set forth in claim 17, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

19. A process that produces a signal-processing system as a physical system exhibiting specific physical characteristics, using a computer system including an input device, a memory device and a processor/controller, said process comprising:

inputing physical characteriscs via said input device;

setting a suiting region, corresponding to an allowable range of said input physical characteristics, in said memory vice;

finding a suiting function, contained in said suiting region, by solving simultaneous inequalities using said processor/controller, said finding a suiting function comprising:

setting said suiting function as a family of functions with parametes corresponding to the parameter of said signal-processing system;

setting a distance from a boundary of a solution region of the parameters of said suiting region; and solving said simultaneous inequities so that said distance is maximized, thereby assigning a specific robust set of parameter values to said physical system; and setting parameters, corresponding to the parameter of said found suiting function, in said signal-processing system.

20. A computer system that determines a set of parameter values of a physical system exhibiting physical characteristics, comprising:

an input device that inputs physical characteristics;

a memory device that stores a suiting region corresponding to an allowable ramge of said physical characteristics;

a setting device that sets said suing region, input via said input device, in said memory device; and a processor/controller that executes a calculation to find a suiting function, contained in said suiting region, by solving simultaneous inequalities, said processor/controller including a first setting system that sets said suiting function as a family of functions with pameters corresponding to the parameters of said physical system, a second setting system that sets a distance from a boundary of a solution region of the parameters of said suiting function, corroding to a boundary of said suiting region, and a solution system that solves said simultaneous inequalities so that said distance becomes larger than a previously-desired level, thereby termining a robust set of parameter values of said physical system.

21. A computer system as set forth in claim 20, wherein said processor/controller further comprises a finder that finds an approximate distance from the boundary of the solution region of said parameters to parameter values of said physical system.

22. A computer system as set forth in claim 20, wherein said suiting function comprises a transfer function of an engineering system.

23. A computer system as set forth in claim 20, wherein said suiting function comprises a recursion relation of an engineering system.

24. A computer system as set forth in claim 20, frther comprising an output device including:
- a suiting-region-display that displays said suiting region; and
- a suiting-function-display that displays said suiting function over said suiting region displayed by said suiting-region-display.

25. A computer system that selects a set of parameter values of a physical system exhibiting physical characteristics, comprising:
- an input device that inputs a family of suting functions with parameters corresponding to the parameters of said physical system, said family of suiting functons being contained in a suiting region corrsponding to an allowable range of physical characteristics;
- a memory device that stores said family of suiting functions; and
- a processor/controller that selects a suiting function from said family of suiting functions by solving simultaneous inequalities, said processor/controller inluding a distance setting system that sets a distance from a boundary of a solution region of the pareters of said suiting function, corresponding to a boundary of said suiting region, a solution system that solves said simultaneous inequalities so that said distance becomes larger than a previously-desired level, thereby determining a robust set of parameter values of said physical system.

26. A suiting process that is performed in a computer system including an input device, a memory device and a processor/controller that detee a set of parameter values of a physical system exlutiting physical characterstics, said process comprising:
- inputting physical characteristics via said input device;
- setting a suiting region, corresponding to an allowable range of said input physical characteristics, in said memory device; and
- finding a suiting function, contained in said suiting region, by solving simultaneous inequalities, using said processor/controller by:
  - setting said suiting function as a family of functions with parameters corresponding to te parameter of said physical system;
  - setting a distance from a boundary of a solution region of the parameters of said suiting function, corresponding to a boundary of said suiting region; and
  - solving said simultaneous inequalities so that said distance becomes larger than a previously-desired level, thereby determining a robust set of parameter values of said physical system.

27. A suiting process as set forth in claim 26, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

28. A suiting process that is performed in a computer system including an input device, a memory device, an output display device and a processor/controller tiat determine and display a set of parameter values of a physical system exhibiting physical characteristics, said process comprising:
- inputting physical characteristics via said input device;
- setting a suiting region, corresponding to an allowable range of said input physical characteristics, in said memory device;
- displaying said suiting region on said output display device;
- finding a suiting function, contained in said suiting region, by solving simultaneous inequalities, using said processor/controller by:
  - setting said suiting function as a family of functions with parameters corresponding the parameters of said physical system;
  - setting a distance from a boundary of a solution region of the parameters of said suiting function, corresponding to a boundary of said suiting region; and
  - solving said simultaneous inequalities so that said distance becomes larger than a previously desired level, thereby determining a set of robust parameter values of said physical system; and
  - displaying said suiting function on said suiting region displayed on said output display device.

29. A suiting process as set forth in claim 28, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

30. A suiting process that is performed in a computer system including an input device, a memory device, an output display device and a processor/controller that select a set of parameter values of a physical system exhibiting physical characteristics, said process comprising:
- inputting a family of suiting functions with parameters corresponding to the parameters of said physical system, via said input device, said family of suiting functions being contained in a suiting region corresponding to an allowable range of physical characteristics;
- storing said family of suiting functions in said memory device; and
- selecting a suiting function from said family of suiting functions by solving simultaneous inequalities using said processor/controller by:
  - setting a distance from a boundary of a solution region of the parameters of said suiting function, corresponding to a boundary of said suiting region; and
  - solving said simultaneous inequalites so that said distance becomes larger than a previously-desired level thereby selecting a robust set of parameter values of said physical system.

31. A suiting process as set forth in claim 30, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

32. A memory medium that stores a suiting program executed in a computer system including an input device, a memory device and a processor/controller that determine a set of parameter values of a physical system exhibiting physical characteristics, said program comprising:

inputting physical characteristics via said input device;

setting a suiting region, corresponding to an allowable range of said input physical characteristics, in said memory device; and finding a suiting function, contained in said suiting region, by solving simultaneous inequalities using said processor/controller by:

setting said suiting function as a family of functions with parameters corresponding to the parameter of said physical system;

setting a distance from a boundary of a solution region of the parameters of said suiting function, corresponding to a boundary of said suiting region; and solving said simultaneous inequalities so that said distance becomes larger than a previously-desired level, thereby determining a robust set of paramet values of said physical system.

33. A memory medium as set forth in claim 32, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

34. A memory medium that stores a suiting program executed in a computer system including an iput device, a memory device, an output display device and a processor/controller that determine and display a set of parameter values of a physical system exhibiting physical chateristics, said program comprising:

inputting physical characterstics via said input device;

setting a suiting region, corresponding to an allowable range of said input physical characteristics, in said memory device;

displaying said suiting region on said ontput display device;

finding a suiting function, contained in said suiting region, by solving simultaneous inequalities using said processor/controller by:

setting said suiting function as a family of functions with parameters corresponding the parameters of said physical system;

setting a disnce from a boundary of a solution region of the parameters of said suiting function, corresponding to a boundary of said suiting region; and solving said simultanmeous inequalities so that said distance becomes larger than a previous-desired level, thereby determining a robust set of parameter values of said physical system; and displaying said suiting function on said suiting region displayed on said output display device.

35. A memory medium as set forth in claim 34, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

36. A memory medium that stores a suiting program, executed in a computer system including an input device, a memory device and a processor/controller that selects a set of parameter values of a physical system exhibiting physical charteristics, said program comprising:

inputting a family of suiting functions with parameters corresponding to the parameters of said physical system via said input device, said family of suiting functions being contained in a suiting region corresponding to an allowable range of physical characteristics;

storing and family of suiting functions in said memory device; and selecting a suiting function from said family of suiting functions by solving simultaneous inequaities using said processor/controller by:

setting a distance from a boundary of a solution region of the parameters of said suiting function, corresponding to a boundary of said suiting region; and solving said simultaneous inequalties so that said distance becomes larger than a previously-desired level, thereby selecting a robust set of parameter values of said physical system.

37. A memory medium as set forth in claim 36, wherein said physical system exhibiting the physical characteristics comprises one of a first engineering system represented by a transfer function of an analog system in frequency domain, a second engineering system represented by a transfer function of a digital system in frequency domain, a third engineering system represented by a recursion relation in time domain, and a fourth engineering system represented by a differential equation in time domain.

38. A process that produces a signal-processing system as a physical system exhibiting specific physical characeristics, using a computer system including an input device, a memory device and a processor/controller, said process comprising:

inputting physical characteristics via said input device;

setting a suiting region, corresonding to an allowable range of said input physical characteristics, in said memory device;

finding a suiting function, contained in said suiting region, by solving simultaneous inequalities, using said process/controller; and setting parameters, corresponding to the parameter of said found suiting function, in said signal-processing system, said finding a suiting region further comprises:

setting said suiting function as a family of functions with parameters corresponding to the parameter of said signal-processing system;

setting a distance from a boundary of a solution region of the parameters of said suting function, corresponding to a boundary of said suting region; and solving said simultaneous inequalities so that said distance becomes larger than a previous-desired level, threrby assigning a specific robust set of parameter values to said physical system.

39. A computer implemented tool that determines a set of parameter values of a physical system exhibiting defined physical characteristics, comprising:

an input device through which the defined physical characteristics of said physical system are input;

a setting device that sets a suiting region, input via said input device;

a memory device that stores said suiting region corresponding to an allowable range of said desired physical characteristics; and a processor/controller that calculates a suiting function contained in said suiting region by solving simultaneous inequalities, said processor/controller further comprising;

a first setting system that sets said suiting function as a family of functions with parameters corresponding to the parameters of said physical system, a second setting system that sets a distance from a boundary of a solution region of the parameters of said suiting function, corresponding to a boundary of said suiting region, and a solution system that solves said simultaneous inequalities so that said distance is maximized, thereby determining a robust set of parameter values of said physical system.

40. A determining device to determine a suiting function possessing a robust set of parameter values corresponding to a set of desired physical characteristics, said determining device comprising:

a setting device that sets a suiting region containing one or more sets of parameter values, said suiting region being input through an input device connected with a computer system;

a memory that stores said suiting region corresponding to an allowable reage of the desired physical characteristics, said desired physical characteristics bing input through said input device connected with said computer system; and a processor/controller that determines at least one suiting function possessing a robust set of parameter values contained in said suiting region by solving simultaneous inequalities, said processor/controller further comprising;

a first setting device that sets said suiting function as a family of functions having parameters, a second setting device that sets a distance measured form a boundary of a solution region of said set of parameters, corresponding to a boundary of said suiting region, and a solution device that solves said simultaneous inequalities so that said distance becomes larger than a previously-determined distance.

\* \* \* \* \*

UNITED STATES PATENT AND TRADEMARK OFFICE
CERTIFICATE OF CORRECTION

PATENT NO.  : 6,311,143 B1
DATED       : October 30, 2001
INVENTOR(S) : M. Ishii et al.

It is certified that error appears in the above-identified patent and that said Letters Patent is hereby corrected as shown below:

<u>Column 4,</u>
Line 35, the equation should be -- $f(x) = (a_0 + a_1 x) / (b_0 + b_1 x) \quad (\forall x \in D)$ --.
Line 36, "parameters" should be -- parameters. --.
Line 65, "$M(x_i)$" should be -- $M^-(x_i)$ --.

<u>Column 5,</u>
Line 34, "ex<sub>i</sub>stence" should be -- existence --.
Line 37, "$\eta^=(x_i)$" should be -- $\eta^+(x_i)$ --.
Line 39, "Tlil" should be -- $\eta_j$'s --.

<u>Column 6,</u>
Line 26, "$H_j:f_{jo}+(X',f'_j)=0$" should be -- $H_j:\eta_{jo} + (x', \eta'_3) = 0$ --.
Lines 27 and 28, "$f'_j$" should be -- $\eta'_j$ --.

<u>Column 7,</u>
Line 58, "An" should be -- As --.
Line 66, "$y_s<0$" should be -- $y_s \leq 0$ --.

<u>Column 8,</u>
Line 4, "ezbodant" should be -- embodiment --.
Line 10, "$|Y|=\Sigma^3_{k,=l}g_{kl}Y_k Y_l)^{1/2}$" should be -- $|Y|=(\Sigma^3_{k'l=l}g_{kl}Y_k Y_l)^{1/2}$ --.
Line 43, "stop" should be -- step --.

<u>Column 9,</u>
Line 1, delete -- (j), --.
Line 33, "$Me^{+(X_i)}$" should be -- $M^+(x_l)$ --.
Line 58, insert -- $A_l$ -- after "$A_0$".

<u>Column 10,</u>
Line 43, "rot" should be -- $r_0$ --.
Line 44, "stop" should be -- step --.

<u>Column 11,</u>
Line 43, "$D_o=(0\leq\Omega\leq\pi)$" should be -- $D_o=\{0 \leq \omega \leq \pi \}$ --.

UNITED STATES PATENT AND TRADEMARK OFFICE
CERTIFICATE OF CORRECTION

PATENT NO. : 6,311,143 B1
DATED : October 30, 2001
INVENTOR(S) : M. Ishii et al.

It is certified that error appears in the above-identified patent and that said Letters Patent is hereby corrected as shown below:

Column 12,
Lines 32 and 65, "identifuncation" should be -- identification --.
Lines 41 and 49, "coeffuncients" should be -- coefficients --.
Line 43, "specifuncation" should be -- specification --.
Line 60, "eabodiment" should be -- embodiment --.
Line 60, "system-identifuncation" should be -- system-identification --.

Column 13,
Lines 37, 38, 56, 65 and 66, "identifuncation" should be -- identification --.
Line 52, "mbodiment" should be -- embodiment --.
Line 60, "coeffuncients" should be -- coefficients --.

Column 14,
Lines 1, 3 and 10, "identifuncation" should be -- identification --.
Line 14, "diffuncult" should be -- difficult --.
Line 32, "suitng" should be -- suiting --.
Line 38, "siutaneous" should be -- simultaneous --.

Column 15,
Line 27, "bounds" should be -- boundary --.

Column 16,
Line 40, after "and" insert -- a fourth --.
Line 55, after "family" insert -- of --.
Line 55, "function" should be -- functions --.
Line 59, "parameter" should be -- parameters --.

Column 17,
Line 7, "at" should be -- input --.
Line 12, "seting" should be -- setting --.
Line 17, "contined" should be -- contained --.
Line 63, "maximzed" should be -- maximized --.
Line 64, "vahles" should be -- values --.

UNITED STATES PATENT AND TRADEMARK OFFICE
CERTIFICATE OF CORRECTION

PATENT NO.    : 6,311,143 B1
DATED         : October 30, 2001
INVENTOR(S)   : M. Ishii et al.

It is certified that error appears in the above-identified patent and that said Letters Patent is hereby corrected as shown below:

Column 18,
Line 16, "vice" should be -- device --.
Line 38, "ramge" should be -- range --.
Line 40, "suing" should be -- suiting --.
Line 47, "pameters" should be -- parameters --.
Line 51, "corroding" should be -- corresponding --.
Line 54, "termining" should be -- determining --.

Column 19,
Line 1, "frther" should be -- further --.
Line 15, "corrsponding" should be -- corresponding --.
Line 21, "inluding" should be -- including --.
Line 23, "pareters" should be -- parameters --.
Line 32, "detee" should be -- determine --.
Line 33, "exlutiting" should be -- exhibiting --.
Line 44, "te" should be -- the --.
Line 64, "tiat" should be -- that --.

Column 20,
Line 17, "a set of robust" should be -- a robust set of --.

Column 21,
Line 16, "paramet" should be -- parameter --.
Line 28, "iput" should be -- input --.
Line 31, "chateristics" should be -- characteristics --.
Line 38, "ontput" should be -- output --.
Line 46, "disnce" should be -- distance --.

Column 22,
Line 29, "characeristics" should be -- characteristics --.
Line 34, "corresonding" should be -- corresponding --.
Lines 47 and 48, "suting" should be -- suiting --.
Line 51, "threrby" should be -- thereby --.

UNITED STATES PATENT AND TRADEMARK OFFICE
CERTIFICATE OF CORRECTION

PATENT NO.    : 6,311,143 B1
DATED         : October 30, 2001
INVENTOR(S)   : M. Ishii et al.

It is certified that error appears in the above-identified patent and that said Letters Patent is hereby corrected as shown below:

Column 23,
Line 21, "reage" should be -- range --.

Column 24,
Line 14, "form" should be -- from --.

Signed and Sealed this

Twenty-fourth Day of June, 2003

JAMES E. ROGAN
*Director of the United States Patent and Trademark Office*